UNITED STATES PATENT OFFICE.

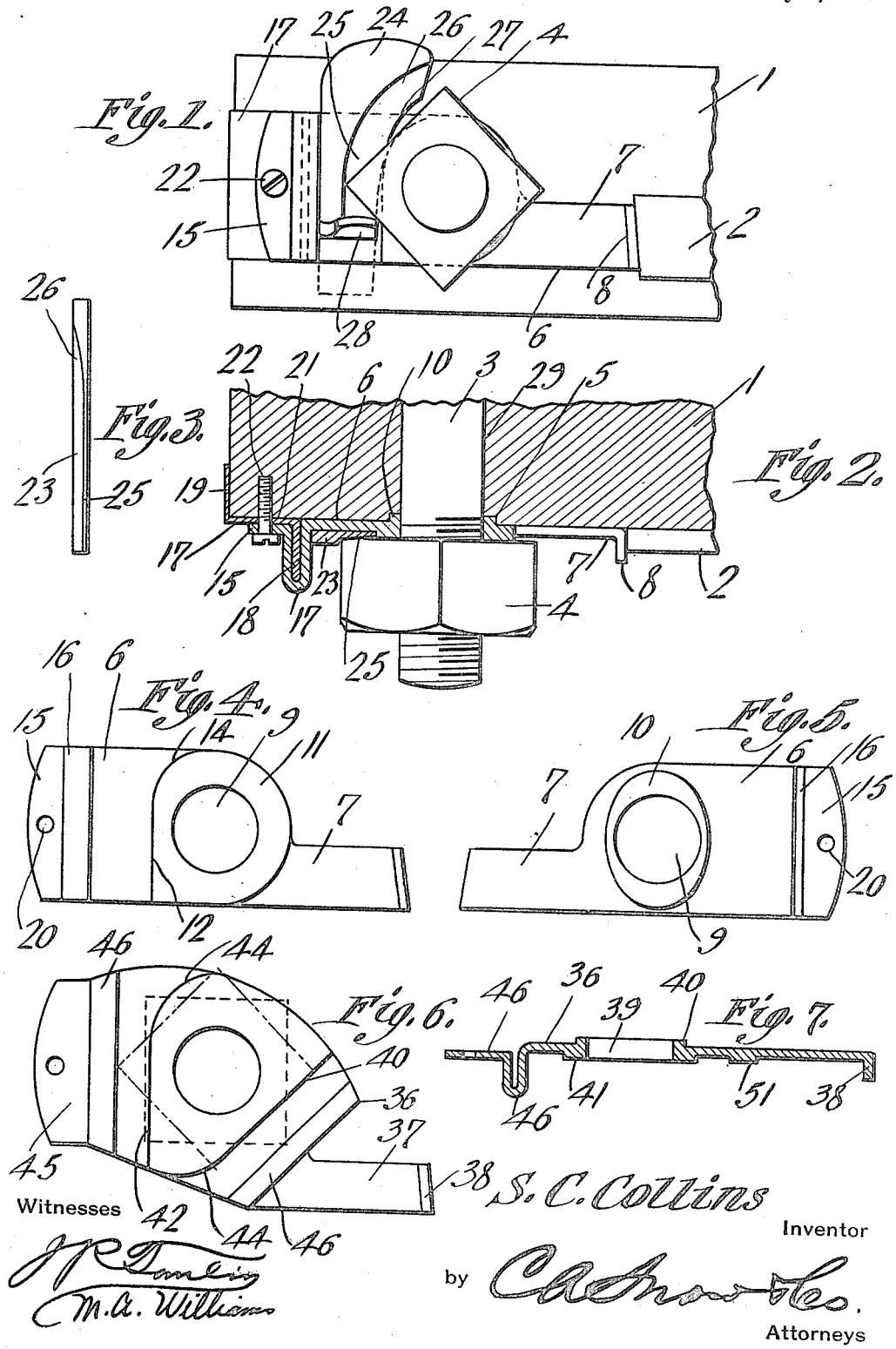

SIMON C. COLLINS, OF BAINBRIDGE, PENNSYLVANIA.

NUT-LOCK.

1,231,851. Specification of Letters Patent. Patented July 3, 1917.

Application filed September 8, 1916. Serial No. 119,097.

*To all whom it may concern:*

Be it known that I, SIMON C. COLLINS, a citizen of the United States, residing at Bainbridge, in the county of Lancaster and State of Pennsylvania, have invented a new and useful Nut-Lock, of which the following is a specification.

The device forming the subject matter of this application is a nut lock, and the objects of the invention are to improve the construction of the wedge which holds the nut in place, to provide novel means for directing the movement of the wedge and for retaining the wedge in place, and to improve the means whereby the washer plate which supports the wedge is prevented from rotating.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings:—

Figure 1 shows in top plan, a piece of material to which the nut lock forming the subject matter of this application has been applied;

Fig. 2 is a longitudinal section of the structure shown in Fig. 1;

Fig. 3 is an elevation of the key;

Fig. 4 is a top plan of the washer plate;

Fig. 5 is a bottom plan of the washer plate;

Fig. 6 is a top plan showing a modified form of washer plate; and

Fig. 7 is a longitudinal section of the structure shown in Fig. 6.

In the drawings, the numeral 1 indicates a support, which may be a piece of material of any desired sort, a fish-plate or the like. Upon its forward face, the support 1 is equipped with a lug 2. The support 1 is provided with an opening 29 through which passes a bolt 3 carrying a nut 4. In the outer face of the support 1 there is fashioned a recess 5 which is of noncircular form. Abutting against the outer face of the support 1 is a main plate 6 which preferably is fashioned from metal. The main plate 6 includes a reduced arm 7 having an outstanding finger 8. The finger 8 bears against one end of the lug 2 and aids in preventing the plate 6 from rotating with the bolt 3 as a center. The plate 6 has a hole 9 through which the bolt 3 passes. On the rear face of the plate 6 there is formed a projection 10 which fits closely in the recess 5 and conforms to the configuration of the said recess. The function of the projection 10 is to aid in preventing the plate 6 from rotating. If the support 1 is made of relatively soft material, the projection 10 on the plate 6 will of itself form the recess 5 in the support 1. On its forward face, the plate 6 is provided with a boss 11 against which the nut 4 is seated. The boss 11 has a straight edge 12 merging into a curved edge 14, as clearly shown in Fig. 4. Adjacent one end 15 of the plate 6, the plate is bent upon itself to form an outstanding rib 16 which is trough-shaped in cross section.

The numeral 17 designates an auxiliary plate bearing against the forward face of the support 1. The auxiliary plate 17 has an outstanding flange 18 received in the rib 16. The auxiliary plate 17 has also an inwardly projecting flange 19 which engages one end face of the support 1. There is a hole 20 in the end 15 of the plate 6, and a corresponding hole 21 is formed in the auxiliary plate 17. Through the holes 20 and 21 is passed a securing element 22 which engages the support 1. The flange 19 of the auxiliary plate 17, engaging one end face of the support 1, aids in preventing the plate 6 from rotating with the bolt 3 as an axis. Because the plate 17 is detachably interengaged with the plate 6 by means of the flange 18 and the rib 16, one auxiliary plate 17 may be substituted for another, the auxiliary plates being of different lengths. This operation permits the flange 19 to engage with the end face of the support 1, when the supports are of different lengths. The plate 6, therefore, may remain unchanged, one plate 17 being substituted for another, as the length of the support 1 may demand. If the projection 10 on the plate 6 is properly engaged with the recess 5, then it may be possible to dispense with the finger 8 and the flange 19 together with the plate 17.

The numeral 23 indicates a key including a lateral head 24. The body portion of the key 24 comprises a transversely inclined face 25, extended as shown at 26 onto the head 24. The key 23 is pushed longitudinally into place, one edge of the key riding along the rib 16, and the other edge of the key riding along the edge 12 of the boss 11. As shown at 27, the inner edge of the head 26 of the key coöperates with the curved edge 14 of the boss 11 when the key is seated. When the nut 4 is rotated to a seat, one corner of the nut rides up onto the inclined face 25 of the key, and owing to the presence of the inclined edge 26 of the key, the rotation of the nut toward the seat will be limited. Stated in slightly different terms, the key is driven underneath the nut, and the face 26 of the key engages the under face of the nut. Then, the end of the key 23 is bent upwardly as shown at 28, to engage one side face of the nut 4, whereupon the nut 4 will be held in place against rotation.

In the modified form shown in Figs. 6 and 7, there appears a main plate 36 having a reduced arm 37 terminating in an outstanding finger 38. The bolt hole in the plate 36 is shown at 39. The plate has on its rear face, a projection 40 corresponding to the projection 10 and having like functions. On the forward face of the plate 6, about the bolt hole 39 there is a boss 41 corresponding to the boss 11. The boss 41 has converging straight edges 42 and curved edges 44. The one rib on the plate 36 is shown at 46, and corresponds to the rib 16. In the end 45 of the plate 36 there is a hole 50. The plate 36 has on its forward face a rib 51 disposed in converging relation to the rib 46.

The structure shown in Figs. 6 and 7 permits the use of two keys, or permits the use of one key at a time, it being possible to insert the key from opposite directions. In one instance, as indicated clearly in Fig. 6, the key will engage beneath one corner of the nut, whereas, in the other case, the key will engage beneath one side of the nut, the operation of the key or keys being the same as that hereinbefore described.

Having thus described the invention, what is claimed is:—

1. A nut lock comprising a washer plate having a transverse rib; a bolt extending through the plate; a nut on the bolt; and a nut engaging key including a laterally extending head, one edge of the key engaging the rib, the other edge of the key being extended beneath the nut and being beveled to form a transversely slanting face, said face being extended onto the inner edge of the head, to form a face which slopes longitudinally of the key, the end of the key being bent to engage one side of the nut to force the adjacent side face of the nut against said longitudinally sloping face of the key.

2. In a device of the class described, a support having a lug; a washer plate including a trough-shaped rib, and a finger engaging the lug; an auxiliary plate including a flange engaged in the rib, and a flange engaging the end face of the support; a bolt passing through the support and through the washer plate; a nut on the bolt; and a wedge key inserted between the washer plate and the bolt, and bearing at one edge upon the rib.

3. In a device of the class described, a support; a washer plate mounted on the support and including a trough-shaped rib; an auxiliary plate comprising oppositely extended flanges, one of which is engaged with the rib, the other of which is engaged with the end face of the support; a bolt extended through the support and through the washer plate; a nut threaded onto the bolt; and a wedge key inserted between the washer plate and the nut, one edge of the key being engaged by the rib.

In testimony that I claim the foregoing as my own, I have hereto affixed my signature in the presence of two witnesses.

SIMON C. X COLLINS.
(his mark)

Witnesses:
W. V. DECKER,
C. H. MUSSELMAN.

Copies of this patent may be obtained for five cents each, by addressing the "Commissioner of Patents, Washington, D. C."